United States Patent
Torres et al.

(10) Patent No.: US 9,253,636 B2
(45) Date of Patent: Feb. 2, 2016

(54) WIRELESS ROAMING AND AUTHENTICATION

(75) Inventors: Esteban Raul Torres, Danville, CA (US); Robert J. Friday, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 13/586,782

(22) Filed: Aug. 15, 2012

(65) Prior Publication Data

US 2014/0051391 A1    Feb. 20, 2014

(51) Int. Cl.
*H04M 1/00* (2006.01)
*H04W 12/06* (2009.01)
*H04L 29/06* (2006.01)
*H04W 84/12* (2009.01)

(52) U.S. Cl.
CPC ........... *H04W 12/06* (2013.01); *H04L 63/0884* (2013.01); *H04L 63/164* (2013.01); *H04W 84/12* (2013.01)

(58) Field of Classification Search
CPC ...... H04W 12/06; H04W 88/06; H04W 80/04
USPC ................. 455/411, 552.1, 444, 462; 370/328
See application file for complete search history.

(56) References Cited

U.S. PATENT DOCUMENTS

| | | | |
|---|---|---|---|
| 7,564,824 B2* | 7/2009 | O'Neill | 370/338 |
| 7,614,078 B1 | 11/2009 | Stieglitz | |
| 7,617,524 B2* | 11/2009 | Haverinen et al. | 726/6 |
| 8,169,958 B2 | 5/2012 | Torres et al. | |
| 2006/0229071 A1* | 10/2006 | Haverinen et al. | 455/432.1 |
| 2011/0113252 A1 | 5/2011 | Krischer et al. | |
| 2012/0054106 A1 | 3/2012 | Stephenson et al. | |
| 2012/0246466 A1* | 9/2012 | Salvarani et al. | 713/156 |

OTHER PUBLICATIONS www.ipass.com.
http://aicent.net/wifi.html.
IETF RFC 4282, B. Aboba et al., "The Network Access Identifier", Dec. 2005.

* cited by examiner

*Primary Examiner* — Chuck Huynh
(74) *Attorney, Agent, or Firm* — Cindy Kaplan

(57) ABSTRACT

In one embodiment, a method includes receiving a Wi-Fi authentication request from a mobile device at a wireless controller, the request including a network access identifier, transmitting the request from the wireless controller to an authentication proxy, wherein the authentication proxy is in communication with a plurality of mobile operator authentication devices and operable to forward the request to one of the mobile operator authentication devices based on the network access identifier, and receiving a response to the request at the wireless controller, wherein the mobile device is permitted Wi-Fi access to a network by the wireless controller if the request is authenticated by the mobile operator authentication device. An apparatus and logic are also disclosed herein.

20 Claims, 3 Drawing Sheets

WIRELESS ROAMING AND AUTHENTICATION

TECHNICAL FIELD

The present disclosure relates generally to wireless networks, and more particularly, to Wi-Fi roaming and authentication.

BACKGROUND

Mobile device users are increasingly using Wi-Fi rather than a cellular network to connect to the Internet. The number of Wi-Fi enabled mobile devices continues to grow and the number of Wi-Fi networks available for roaming is expected to increase. Access to a Wi-Fi network often requires logging in on a portal page and entering a password to gain Wi-Fi access at a public hotspot. Hotspot 2.0 is an industry initiative to develop standards based interoperable Wi-Fi authentication and handoff to provide a seamless handoff between cellular and Wi-Fi networks that allows mobile device users to roam between two networks without the need for additional authentication. Hotspot 2.0 enables enterprises to provide guest access by using trusted credentials from a service provider in a visitor's mobile device. However, this requires the transfer of credentials from visitors associated with different service providers back to each of the service providers for authentication.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
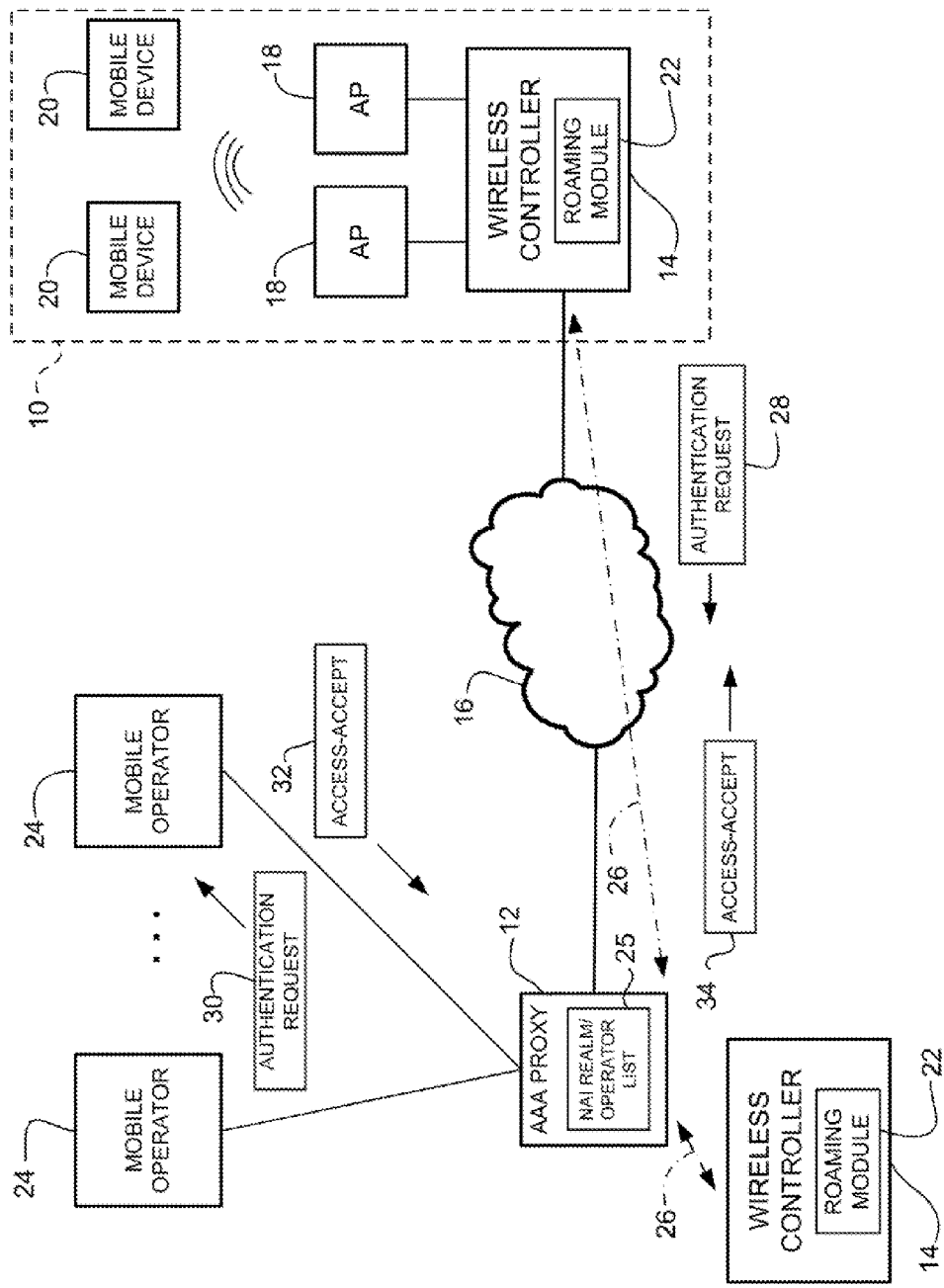
FIG. 1 illustrates an example of a network in which embodiments described herein may be implemented.

In one embodiment, a method generally comprises receiving a Wi-Fi authentication request from a mobile device at a wireless controller, the request including a network access identifier, transmitting the request from the wireless controller to an authentication proxy, wherein the authentication proxy is in communication with a plurality of mobile operator authentication devices and operable to forward the request to one of the mobile operator authentication devices based on the network access identifier, and receiving a response to the request at the wireless controller. The mobile device is permitted Wi-Fi access to a network by the wireless controller if the request is authenticated by the mobile operator authentication device.

In another embodiment, an apparatus generally comprises a roaming module for receiving a Wi-Fi authentication request from a mobile device, transmitting the request to an authentication proxy, and receiving a response to the request. The apparatus further comprises memory for storing the response for use in enabling Wi-Fi access for the mobile device if the request is authenticated by a mobile operator authentication device. The request comprises a network access identifier and the authentication proxy is configured for communication with a plurality of mobile operator authentication devices and operable to forward the request to the mobile operator authentication device selected based on the network access identifier.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Enterprises that have a high number of visitors relative to employees (e.g., retail, healthcare, education, hotels, and the like), view guest access as a network requirement and a cost of doing business. Hotspot standards enable enterprises to reduce costs of guest access by automating the access using a trusted credential from a service provider in the visitor's device (e.g., SIM (subscriber identity module) credential from AT&T). Hotspot 2.0 is one example of a Wi-Fi certified hotspot program to ensure that Wi-Fi devices can easily connect to hotspots in a secure interoperable manner by defining technologies and certification requirements for Wi-Fi infrastructure devices as well as endpoints such as handsets, tablets and laptop computers. Enterprises may use Hotspot 2.0 to become mini-service providers by making Wi-Fi guest access automatic and secure. The enterprise may have visitors with credentials from many different service providers. A problem that arises for the enterprise is how to get credentials from visitors coming into the enterprise from different service providers back to each of the service providers for authentication.

In a conventional GSM (global system for mobile communications) roaming model, the enterprise would behave like a mini-visited operator and select a clearinghouse. The clearinghouse has peering contracts with other clearinghouses to get the credentials back to the home operator. It may be one hop to get the credential back to the home operator, if the visited operator and home operator use the same clearinghouse, otherwise, it may be two or three hops.

A problem with Wi-Fi roaming is that there are too many enterprises for tier one mobile operators to do direct roaming agreements with each enterprise. Therefore, the clearinghouses are attempting to take on the enterprise aggregation function in addition to data and financial clearinghouse functions. These clearinghouses are referred to as Wi-Fi roaming hubs. Rather than setting up peering contracts for Wi-Fi roaming, the Wi-Fi roaming hubs are trying to bulk up by aggregating as many Wi-Fi networks as possible and demanding exclusivity. This is driving up the Wi-Fi roaming tariffs, as well as creating confusion.

The embodiments described herein (referred to as vendor-direct roaming exchange) avoid the use of financial clearinghouses operating as Wi-Fi roaming hubs by incorporating a roaming feature in a WLAN (wireless local area network) infrastructure that enables visitors to a venue to get automatic and secure Wi-Fi guest Internet access using trusted credentials from a third party (e.g., mobile operator, Internet company, etc.). In the vendor-direct roaming exchange, the enterprises send their authentication requests to a vendor control point in the cloud (e.g., vendor-operated cloud based AAA (authentication, authorization, and accounting) proxy). In one embodiment, the AAA proxy maintains a list of the NAI (network address identifier) realms of the service providers and their corresponding authentication devices (e.g., mobile/home operator, mobile operator clearinghouse).

The vendor-direct roaming exchange embodiments described herein provide cost savings since the vendor (proxy server) is doing the aggregation rather than a new entity (e.g., financial clearinghouse) that brings additional costs. With vendor-direct roaming exchange, the Wi-Fi roaming hubs have no negotiating leverage with mobile operators or enterprises. If a Wi-Fi infrastructure vendor were to select a single clearinghouse rather than implement vendor-direct roaming exchange, the vendor would be tied to the clearinghouse. The embodiments enable mobile operators to swap clearinghouses whenever they want, since there is no stickiness (persistence) associated with the clearinghouse function.

Referring now to the drawings, and first to FIG. 1, an example of a network in which embodiments described herein may be implemented is shown. For simplification, only a small number of network devices are shown. The network includes a network site (enterprise) 10 in communication with an authentication proxy (e.g., AAA proxy server) 12. The network site 10 includes a wireless controller 14 in communication with the authentication proxy 12 via network 16. In the example shown in FIG. 1, the wireless controller 14 is in wired communication with two access points (APs) 18 for wireless communication with any number of mobile devices (wireless devices, client devices, user devices, endpoints) 20 via a wireless network (e.g., WLAN (wireless local area network)) at the network site 10. The authentication proxy 12 is in communication with any number of mobile operators (home operators, home agents, mobile hosts) 24. The mobile operator 24 may be a mobile operator authentication device located at a mobile operator clearinghouse or any other network device configured to authenticate mobile devices 20 associated with the mobile operator.

The network site 10 may be, for example, a retail store, hotel, healthcare entity, entertainment center, restaurant, shopping center, education center, corporate headquarter, branch office, campus environment, or any other site offering Wi-Fi network access. The network site 10 may be, for example, a wireless LAN hotspot providing service to one or more Internet Service Providers (ISPs).

The network site 10 may also include a wireless control system or other platform for centralized wireless LAN planning, configuration, and management. The wireless controller 14 may be in communication with one or more networks (e.g., local area network, private network, virtual private network, wireless local area network) at the network site 10 or another location.

The term 'wireless controller' as used herein may refer to a mobility controller, wireless control device, wireless control system, access point, or any other network device operable to perform control functions for a wireless network. The wireless controller 14 enables system wide functions for wireless applications and may support any number of access points 18 in the enterprise 10. Each access point 18 may serve any number of client devices 20 in the wireless network at the network site 10. The wireless controller 14 includes one or more processor, memory, and interfaces, as described below with respect to FIG. 2. The wireless controller 14 may be, for example, a standalone device or a rack-mounted appliance. In the example shown in FIG. 1, the wireless controller 14 and access points 18 are separate devices. The wireless controller 14 may also be integrated with the access point 18 (e.g., autonomous AP).

The mobile device 20 may be any suitable equipment that supports wireless communication, including for example, a mobile phone, personal digital assistant, portable computing device, laptop, tablet, multimedia device, or any other wireless device. The mobile devices 20 and access points 18 are configured to perform wireless communication according to a wireless network communication protocol such as IEEE 802.11/Wi-Fi. For example, the mobile devices 20 may communicate in accordance with IEEE 802.11u and Hotspot 2.0.

The network site 10 is in communication with the authentication proxy 12 via network 16. The network 16 may include one or more networks (e.g., local area network, wireless local area network, cellular network, metropolitan area network, wide area network, satellite network, Internet, intranet, radio access network, public switched network, virtual private network, or any other network or combination thereof). Communication paths between the network site 10 and authentication proxy 12 may include any number or type of intermediate nodes (e.g., routers, switches, gateways, or other network devices), which facilitate passage of data between the network site and proxy.

As shown in FIG. 1, the wireless controller 14 communicates with the authentication proxy 12 over a tunnel 26 with endpoints at the wireless controller and authentication proxy. The authentication proxy 12 and wireless controller 14 may communicate, for example, over a VPN (virtual private network) using RADIUS (Remote Authentication Dial-In User Service) over IPsec (Internet Protocol security), or other communication protocols. Authentication requests 28 and responses 34 are sent over the tunnel 26. After the mobile device 20 is authenticated, mobile device traffic is sent over the network by means other than the tunnel 26.

The wireless controller 14 includes a roaming module 22 operable to forward Wi-Fi authentication requests 28 received from the mobile device 20 to the authentication proxy 12. Roaming allows the use of various service providers while maintaining a formal, customer-vendor relationship with one service provider. The wireless controller 14 automatically sets up the secure tunnel 26 to the authentication proxy 12 and authentication requests 28 received from the mobile device 20 are automatically forwarded over the tunnel to the authentication proxy.

The authentication proxy 12 acts as an intermediary to proxy authentication requests between the enterprise 10 and the mobile operator 24 associated with the mobile device 20 requesting Wi-Fi access to the network. The authentication proxy 12 aggregates requests 28 received from wireless controllers 14 and forwards the requests directly to the mobile operators 24 (or mobile operator clearinghouses) and therefore eliminates the need for Wi-Fi roaming hubs.

The authentication proxy 12 may be, for example, a server such as Cisco Access Registrar, available from Cisco Systems, Inc. of San Jose, Calif., or any other vendor network device operable to provide a proxy service. The authentication proxy 12 may be configured to provide one or more authentication, authorization, or accounting proxy functions and capability for RADIUS. Thus, the term 'authentication' as used herein may refer to any process performed in response to receiving a request from a user device to access a network.

The authentication proxy 12 may be in communication with any number of wireless controllers 14 located at any number of enterprises. For simplification, details of the network connection and network site at the second wireless controller 14 are not shown in FIG. 1. The authentication proxy 12 may also be in communication with any number of mobile operators 24.

The authentication proxy 12 includes a list 25 mapping mobile device identifiers (e.g., network access identifier (NAI) realms) to mobile operators. The NAI is used to identify the user as well as assist in the routing of the authentication request. AAA servers at the mobile operators 24 identify clients using the NAI. In one example, the NAI is a character string that can be a unique identifier (e.g., username@realm) or a group identifier (realm). It is to be understood that the term network access identifier as used herein may refer to any user identity submitted by the mobile device 20 during network access authentication.

The Wi-Fi authentication request 28 received at the wireless controller 14 includes the network access identifier stored at the mobile device 20 and credentials assigned to the mobile device user by the mobile operator. The credentials may include, for example, an SSID (service set identifier), SIM (subscriber identity module), user password, or any combination of these or other credentials. The credentials are typically encrypted and forwarded to the mobile operator 24 in their encrypted state.

Upon receiving an authentication request 28, the authentication proxy 12 uses the NAI realm in the request to lookup the corresponding mobile operator 24 to which to forward the request for processing. The authentication proxy 12 forwards the authentication request 30 to the mobile operator 24 selected based on the identifier in the request. The mobile operator authentication device 24 contains an AAA server (not shown) for use in authenticating the mobile device 20. The mobile operator 24 responds to the request 30 with an access-accept packet 32 if the mobile device 20 is authenticated and allowed access, or an access-deny response (not shown) if the mobile device is denied access. The authentication proxy 12 forwards the response 34 to the wireless controller 14.

It is to be understood that the network shown in FIG. 1 and described herein is only an example and that other networks having different components or configurations may be used, without departing from the scope of the embodiments. For example, the authentication proxy 12 may be in communication with any number of wireless controllers 14 and mobile operators 24.

Figure 2:
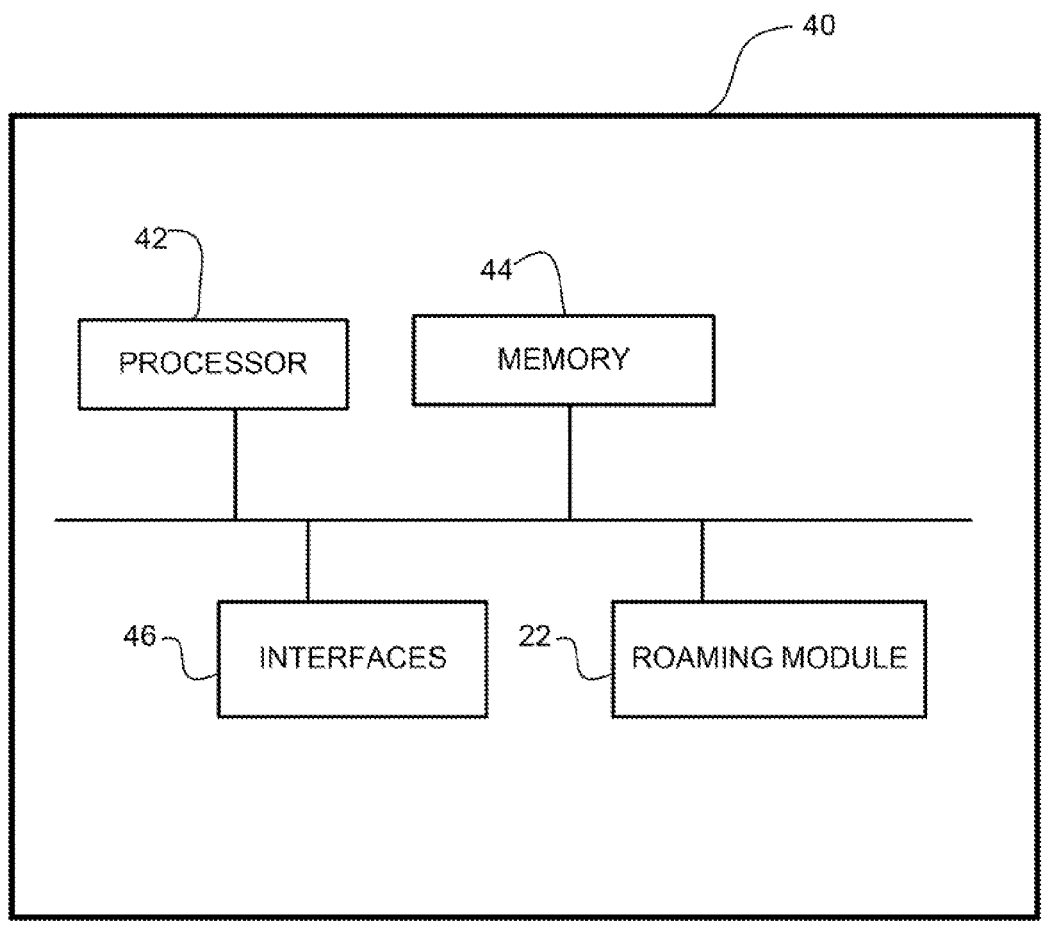
FIG. 2 depicts an example of a network device useful in implementing embodiments described herein.

FIG. 2 illustrates an example of a network device 40 (e.g., wireless controller) that may be used to implement the embodiments described herein. In one embodiment, the network device 40 is a programmable machine that may be implemented in hardware, software, or any combination thereof. The network device 40 includes one or more processor 42, memory 44, network interfaces 46, and roaming module 22.

Memory 44 may be a volatile memory or non-volatile storage, which stores various applications, operating systems, modules, and data for execution and use by the processor 42. Memory 44 may store, for example, authentication states for one or more mobile devices 20 based on authentication responses received from the authentication proxy 12. For example, if an authentication request is allowed by the mobile operator, an indication of the authentication of the mobile device 20 may be stored in memory 44, for use in enabling Wi-Fi access for the mobile device at the network site 10.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 46 may comprise any number of interfaces (linecards, ports) for receiving data or transmitting data to other devices. The network interfaces 46 may include, for example, an Ethernet interface for connection to a computer or network.

The roaming module 22 may comprise computer code, logic, or other device or mechanism. For example, the roaming module 22 may comprise computer code stored in memory 44.

It is to be understood that the network device 40 shown in FIG. 2 and described above is only an example and that different configurations of network devices may be used. For example, the network device 40 may further include any suitable combination of hardware, software, algorithms, processors, devices, components, or elements operable to facilitate the capabilities described herein.

Figure 3:
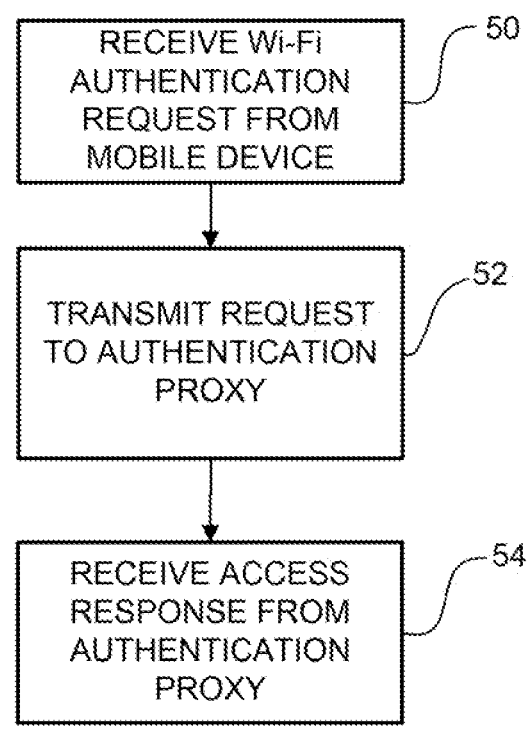
FIG. 3 is a flowchart illustrating an overview of a process for a Wi-Fi roaming exchange at a wireless controller, in accordance with one embodiment.

FIG. 3 is a flowchart illustrating an example of wireless roaming and authentication at the wireless controller 14, in accordance with one embodiment. At step 50, the wireless controller 14 receives a Wi-Fi authentication request from mobile device 20. The mobile device 20 comprises an identifier (e.g., NAI realm) associated with a mobile operator. The wireless controller 14 transmits the request 28 to the authentication proxy 12 (step 52). The authentication proxy 12 is in communication with a plurality of wireless controllers 14 and a plurality of mobile operator authentication devices 24, and is operable to forward the request to one of the mobile operator authentication devices based on the identifier in the received request. As previously described, the authentication proxy 12 comprises a list 25 of the network access identifier realms and the mobile operator authentication devices (e.g., mobile operator, home operator, clearinghouse of the mobile operator) 24 corresponding to the realms.

The authentication proxy 12 proxies the request to the mobile operator 24 for the realm specified in the authentication request 28. If the mobile device 20 is authenticated by the AAA server at the mobile operator 24, the proxy 12 receives an access-accept response from the mobile operator. If authentication is denied, the mobile operator 24 transmits an access-deny response. The proxy forwards the response to the wireless controller 14 (step 54). If the mobile device 20 is authenticated, the mobile device is permitted Wi-Fi access to the network by the wireless controller 14 based on authentication by the mobile operator 24.

It is to be understood that the process illustrated in FIG. 3 is only an example and that steps may be modified or added without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:

receiving a Wi-Fi authentication request from a mobile device at a wireless controller, said request comprising a network access identifier, the wireless controller operable to perform control functions for a wireless network and communicate with the mobile device through an access point in the wireless network;

transmitting said request from the wireless controller to an authentication proxy over a tunnel with endpoints at the wireless controller and the authentication proxy, wherein the authentication proxy is in communication with a plurality of mobile operator authentication devices and operable to forward said request to one of the mobile operator authentication devices based on said network access identifier;

receiving a response to said request at the wireless controller authenticating the mobile device; and transmitting mobile device traffic on a path different than said tunnel;

wherein the mobile device is permitted Wi-Fi access to a network by the wireless controller if said request is authenticated by the mobile operator authentication device; and wherein the authentication proxy comprises a mapping of network access identifiers to mobile operator authentication devices and is configured to aggregate a plurality of authentication requests from a plurality of wireless controllers for transmittal to one of the mobile operator authentication devices.

2. The method of claim 1 wherein said network address identifier comprises a realm and the authentication proxy comprises a list of realms and the mobile operator authentication devices corresponding to the realms.

3. The method of claim 1 wherein the authentication proxy is configured to aggregate a plurality of authentication requests from a plurality of wireless controllers.

4. The method of claim 1 wherein the wireless controller and the authentication proxy are in communication over a virtual private network.

5. The method of claim 1 wherein transmitting said Wi-Fi authentication request comprises transmitting said request over an Internet Protocol security (IPsec) tunnel comprising endpoints at the authentication proxy and the wireless controller.

6. The method of claim 1 wherein the authentication proxy comprises an authentication, authorization, and accounting proxy server.

7. The method of claim 1 wherein receiving said Wi-Fi authentication request comprises receiving said request from an access point in wireless communication with the mobile device.

8. An apparatus comprising:
a roaming module for receiving a Wi-Fi authentication request from a mobile device at a wireless controller operable to perform control functions for a wireless network, transmitting said request to an authentication proxy over a tunnel with endpoints at the wireless controller and the authentication proxy, receiving a response to said request, and transmitting mobile device traffic on a path different than said tunnel; and
memory for storing said response for use in enabling Wi-Fi access for the mobile device if said request is authenticated by a mobile operator authentication device;
wherein said request comprises a network access identifier and the authentication proxy is configured for communication with a plurality of mobile operator authentication devices and operable to forward said request to the mobile operator authentication device selected based on said network access identifier; and
wherein the authentication proxy comprises a mapping of network access identifiers to mobile operator authentication devices and is configured to aggregate a plurality of authentication requests from a plurality of wireless controllers for transmittal to one of the mobile operator authentication devices.

9. The apparatus of claim 8 wherein said network address identifier comprises a realm and the authentication proxy comprises a list of realms and the mobile operator authentication devices corresponding to the realms.

10. The apparatus of claim 8 wherein the authentication proxy is configured to aggregate a plurality of authentication requests from a plurality of wireless controllers.

11. The apparatus of claim 8 wherein the apparatus is configured for communication with the authentication proxy over a virtual private network.

12. The apparatus of claim 8 wherein said Wi-Fi authentication request is transmitted over an Internet Protocol security (IPsec) tunnel with endpoints at the authentication proxy and the apparatus.

13. The apparatus of claim 8 wherein the authentication proxy comprises an authentication, authorization, and accounting proxy server.

14. The apparatus of claim 8 wherein said Wi-Fi authentication request is received from an access point in wireless communication with the mobile device.

15. Logic encoded on one or more non-transitory computer readable media for execution and when executed operable to:
receive a Wi-Fi authentication request from a mobile device at a wireless controller, the request comprising a network access identifier, the wireless controller operable to perform control functions for a wireless network and communicate with the mobile device through an access point in the wireless network;
transmit said request to an authentication proxy over a tunnel with endpoints at the wireless controller and the authentication proxy, wherein the authentication proxy is configured for communication with a plurality of mobile operator authentication devices and operable to forward said request to one of the mobile operator authentication devices based on said network access identifier;
receive a response to said request authenticating the mobile device; and
transmit mobile device traffic on a path different than said tunnel;
wherein the mobile device is permitted Wi-Fi access to a network by the wireless controller if said request is authenticated by the mobile operator authentication device; and
wherein the authentication proxy comprises a mapping of network access identifiers to mobile operator authentication devices and is configured to aggregate a plurality of authentication requests from a plurality of wireless controllers for transmittal to one of the mobile operator authentication devices.

16. The logic of claim 15 wherein said network address identifier comprises a realm and the authentication proxy comprises a list of realms and the mobile operator authentication devices corresponding to the realms.

17. The logic of claim 15 wherein the authentication proxy is configured to aggregate a plurality of authentication requests from a plurality of wireless controllers.

18. The logic of claim 15 wherein the wireless controller is configured for communication with the authentication proxy over a virtual private network.

19. The logic of claim 15 wherein said Wi-Fi authentication request is transmitted over an Internet Protocol security (IPsec) tunnel with endpoints at the authentication proxy and the wireless controller.

20. The logic of claim 15 wherein said Wi-Fi authentication request is received from an access point in wireless communication with the mobile device.

\* \* \* \* \*